United States Patent
Pierpont

(10) Patent No.: US 8,938,962 B2
(45) Date of Patent: Jan. 27, 2015

(54) EXHAUST SYSTEM

(75) Inventor: David Andrew Pierpont, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 446 days.

(21) Appl. No.: 13/363,017

(22) Filed: Jan. 31, 2012

(65) Prior Publication Data

US 2013/0192223 A1  Aug. 1, 2013

(51) Int. Cl.
| | | |
|---|---|---|
| *F02B 33/44* | (2006.01) | |
| *F02B 33/00* | (2006.01) | |
| *F02M 25/07* | (2006.01) | |
| *F02B 37/007* | (2006.01) | |

(52) U.S. Cl.
CPC .......... *F02B 37/007* (2013.01); *F02M 25/0754* (2013.01); *F02M 25/0707* (2013.01); *F02M 25/0755* (2013.01); *F02M 25/0726* (2013.01)
USPC ........ 60/605.2; 60/612; 123/562; 123/568.12

(58) Field of Classification Search
CPC ........ F02B 37/007; F02B 37/16; F02B 37/18; F02M 25/0707; F02M 25/0713; F02M 25/0726; F02M 25/0754; F02M 25/0755
USPC .................... 60/605.2, 612; 123/562, 568.12; 701/108
IPC ..................................................... F02M 25/07
See application file for complete search history.

(56) References Cited

U.S. PATENT DOCUMENTS

| | | | |
|---|---|---|---|
| 5,611,203 A | 3/1997 | Henderson et al. | |
| 5,794,445 A * | 8/1998 | Dungner ................ | 60/605.2 |
| 6,467,270 B2 | 10/2002 | Mulloy et al. | |
| 6,484,500 B1 * | 11/2002 | Coleman et al. ........ | 60/605.2 |
| 6,694,736 B2 | 2/2004 | Pflüger | |
| 7,000,393 B1 | 2/2006 | Wood et al. | |
| 7,110,876 B2 | 9/2006 | Uchiyama et al. | |
| 7,165,540 B2 | 1/2007 | Brookshire et al. | |
| 7,320,219 B2 | 1/2008 | Sun | |
| 7,426,830 B2 * | 9/2008 | Schorn et al. ............ | 60/605.2 |
| 7,540,150 B2 * | 6/2009 | Schmid et al. ............ | 60/605.2 |
| 7,877,981 B2 * | 2/2011 | Newman .................. | 60/605.2 |
| 7,941,999 B2 | 5/2011 | Kasper et al. | |
| 8,096,124 B2 * | 1/2012 | Pierpont et al. .......... | 60/605.2 |
| 8,297,053 B2 * | 10/2012 | Gladden et al. .......... | 60/605.2 |
| 8,297,054 B2 * | 10/2012 | Gladden et al. .......... | 60/605.2 |
| 2005/0274366 A1 * | 12/2005 | Sato ........................ | 60/605.2 |

(Continued)

FOREIGN PATENT DOCUMENTS

JP    2007-263040    10/2007

*Primary Examiner* — Thai Ba Trieu

(74) *Attorney, Agent, or Firm* — Finnegan, Henderson, Farabow, Garrett & Dunner LLP

(57) ABSTRACT

An exhaust system for an engine includes a first exhaust manifold configured to receive exhaust from the engine, a second exhaust manifold configured to receive exhaust from the engine in parallel with the first exhaust manifold, and at least two turbochargers configured to receive exhaust from the first and second exhaust manifolds. The system also includes a first turbocharger valve fluidly connected to one of the at least two turbochargers. The first turbocharger valve is configured to selectively fluidly connect the one of the at least two turbochargers to the first and second exhaust manifolds. The system further includes a recirculation circuit in fluid communication with the first exhaust manifold. The recirculation circuit includes a first recirculation valve configured to regulate passage of exhaust through the recirculation circuit.

16 Claims, 1 Drawing Sheet

(56) References Cited

U.S. PATENT DOCUMENTS

| | | |
|---|---|---|
| 2006/0266019 A1 | 11/2006 | Ricart-Ugaz |
| 2007/0295001 A1* | 12/2007 | Newman .......................... 60/280 |
| 2008/0216475 A1* | 9/2008 | Kasper et al. ................. 60/605.2 |
| 2010/0024416 A1* | 2/2010 | Gladden et al. .............. 60/605.2 |
| 2010/0077747 A1* | 4/2010 | Pierpont et al. .............. 60/605.2 |
| 2010/0107629 A1* | 5/2010 | Gladden et al. .............. 60/605.2 |
| 2010/0154412 A1 | 6/2010 | Andreae et al. |
| 2010/0300089 A1 | 12/2010 | Gibble et al. |
| 2012/0260650 A1* | 10/2012 | Luft et al. .................... 60/605.2 |
| 2012/0260653 A1* | 10/2012 | Luft et al. .................... 60/605.2 |
| 2013/0167528 A1* | 7/2013 | Schlund et al. ................. 60/612 |

\* cited by examiner

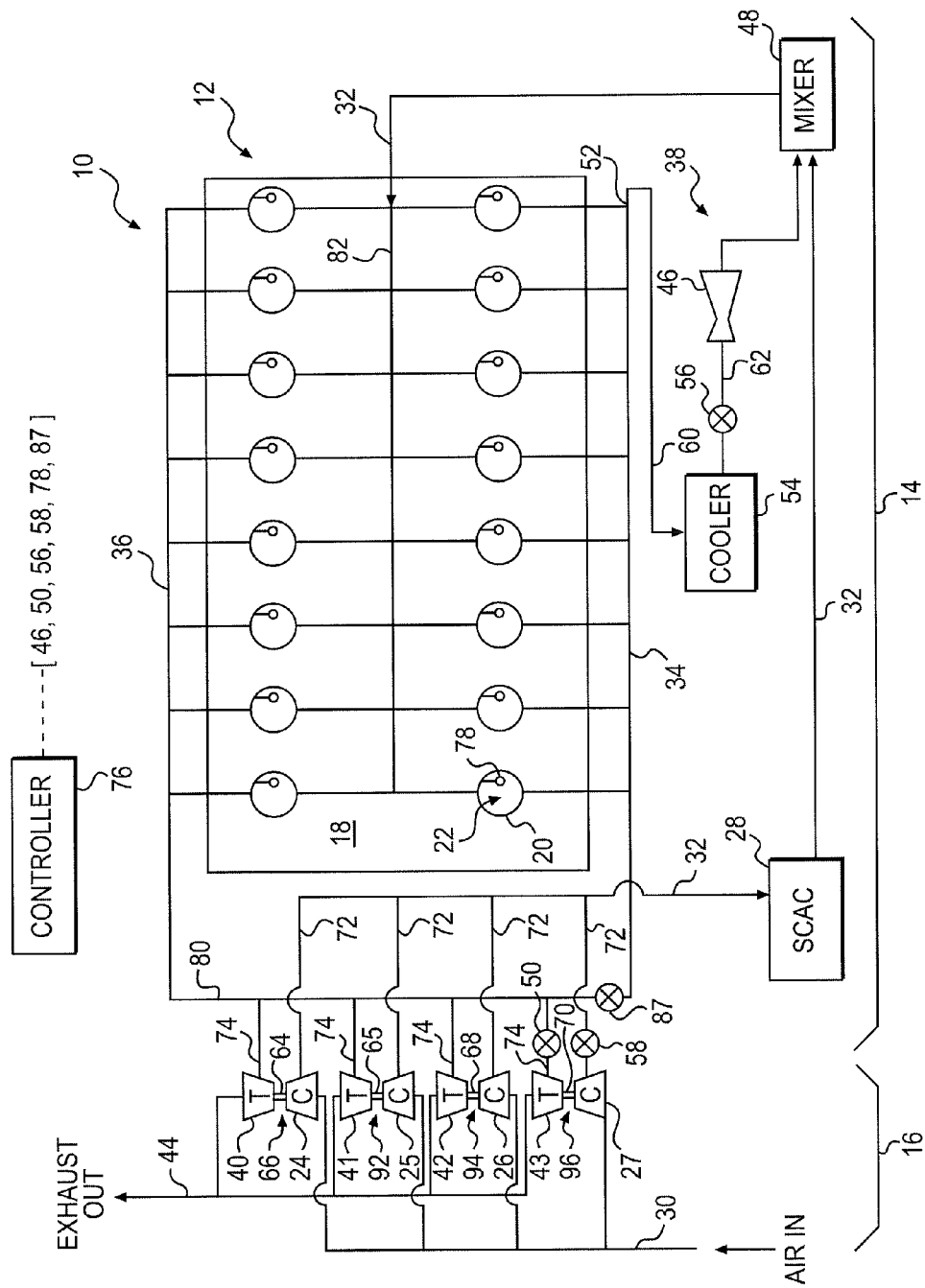

EXHAUST SYSTEM

TECHNICAL FIELD

The present disclosure is directed to an exhaust system and, more particularly, to an exhaust system having exhaust gas recirculation (EGR) capabilities.

BACKGROUND

Combustion engines such as diesel engines, gasoline engines, and gaseous fuel-powered engines are supplied with a mixture of air and fuel for combustion within the engine in order to generate a mechanical power output. Such combustion engines exhaust a complex mixture of air pollutants as byproducts of the combustion process, and due to increased attention on the environment, exhaust emission regulations continue to become more stringent. The amount of pollutants emitted to the atmosphere from an engine can be regulated depending on the type of engine, size of engine, and/or class of engine. For example, the International Maritime Organization (IMO) has designated various emission zones off of the coasts of North America and Europe. Effective in 2014, the IMO's emissions regulations (IMO3) will be most stringent in a first zone extending approximately 200 miles from the coast of these continents, and will be less stringent in a second zone extending beyond approximately 200 miles from such coastal areas.

One method that has been implemented by engine manufacturers to comply with the regulation of exhaust emissions includes utilizing an EGR system. EGR systems operate by recirculating a portion of the exhaust produced by the engine back to the intake of the engine to mix with fresh combustion air. The resulting mixture has a lower combustion temperature and, subsequently, produces a reduced amount of regulated pollutants. Although such EGR systems may be useful in reducing the amount of regulated pollutants produced during combustion, utilizing EGR can adversely affect, for example, the air compressing capabilities of the engine's air induction system. For example, diverting a portion of the combustion exhaust to the EGR system may cause one or more turbochargers associated with the engine to operate below its peak efficiency range. Thus, the reduced air compressing capability caused by activation of the EGR system may reduce the engine's fuel economy and, possibly, the amount of power generated by the engine.

An example of a turbocharged engine utilizing EGR technology is disclosed in U.S. Pat. No. 6,694,736 (the '736 patent) issued to Pflüger on Feb. 24, 2004. The '736 patent discloses an engine with a common intake manifold and divided exhaust manifolds. Two high-pressure turbochargers having respective high-pressure compressors and high-pressure turbines are separately associated with the common intake manifold and the two exhaust manifolds, and a single low-pressure turbocharger receives exhaust from each of the two high-pressure turbochargers. In addition, exhaust return pipes are connected to the intake manifold downstream of the high-pressure compressors to direct exhaust from upstream of the high-pressure turbines back into the engine.

While the system disclosed in the '736 patent may utilize EGR technology to reduce the amount of pollutants present in the engine exhaust, the disclosed system may not be well suited for all applications. For example, operating the engine of the '736 patent and its EGR system to satisfy relatively stringent emissions regulations (such as those discussed above with respect to IMO3) may decrease the amount of exhaust directed to the turbochargers. Such operation may cause one or more of the turbochargers to operate outside of its peak efficiency range, thereby resulting in lower fuel economy and less than optimal power generation.

The disclosed exhaust system is directed to overcoming one or more of the problems set forth above and/or other problems of the prior art.

SUMMARY

In an exemplary embodiment of the present disclosure, an exhaust system for an engine includes a first exhaust manifold configured to receive exhaust from the engine, a second exhaust manifold configured to receive exhaust from the engine in parallel with the first exhaust manifold, and at least two turbochargers configured to receive exhaust from the first and second exhaust manifolds. The system also includes a first turbocharger valve fluidly connected to one of the at least two turbochargers. The first turbocharger valve is configured to selectively fluidly connect the one of the at least two turbochargers to the first and second exhaust manifolds. The system further includes a recirculation circuit in fluid communication with the first exhaust manifold. The recirculation circuit includes a first recirculation valve configured to regulate passage of exhaust through the recirculation circuit.

In another exemplary embodiment of the present disclosure, an exhaust system for an engine includes a first exhaust manifold configured to receive exhaust from the engine, a second exhaust manifold configured to receive exhaust from the engine in parallel with the first exhaust manifold, and a plurality of turbochargers being driven by exhaust from the first and second exhaust manifolds. The system also includes first and second turbocharger valves associated with a turbocharger of the plurality of turbochargers. The first turbocharger valve selectively fluidly connects the turbocharger to the first and second exhaust manifolds, and the second turbocharger valve selectively fluidly connects the turbocharger to an intake manifold of the engine. The system further includes a recirculation circuit in fluid communication with the first exhaust manifold, and first and second recirculation valves regulating passage of exhaust through the recirculation circuit. The first and second turbocharger valves are controlled based on a characteristic of exhaust passing through the recirculation circuit.

In a further exemplary embodiment of the present disclosure, a method of handling exhaust from an engine includes receiving exhaust from the engine, and forming a first flow of exhaust, a second flow of exhaust, and a recirculation flow of exhaust with the exhaust received from the engine. The method also includes removing energy from the first flow of exhaust with a turbocharger, and removing energy from the second flow of exhaust in parallel with the removal of energy from the first flow of exhaust. The method further includes directing the recirculation flow of exhaust back into the engine, determining a characteristic of the recirculation flow of exhaust, and blocking passage of the first flow of exhaust into the turbocharger based on the characteristic.

BRIEF DESCRIPTION OF THE DRAWING

FIG. 1 is a schematic illustration of an exemplary power system.

DETAILED DESCRIPTION

FIG. 1 illustrates a power system 10 having a power source 12, an air induction system 14, and an exhaust system 16. For the purposes of this disclosure, power source 12 is depicted and described as a four-stroke diesel engine. One skilled in the art will recognize, however, that power source 12 may be any other type of combustion engine such as, for example, a gasoline or a gaseous fuel-powered engine. Power source 12 may include an engine block 18 that at least partially defines a plurality of cylinders 20. A piston (not shown) may be slidably disposed within each cylinder 20 to reciprocate between a top-dead-center position and a bottom-dead-center position, and a cylinder head (not shown) may be associated with each cylinder 20. Each cylinder 20, piston, and cylinder head may together at least partially define a combustion chamber 22. In the illustrated embodiment, power source 12 includes sixteen such combustion chambers 22 arranged in a V-configuration (i.e., a configuration having two banks or rows of combustion chambers 22). However, it is contemplated that power source 12 may include a greater or lesser number of combustion chambers 22 and that combustion chambers 22 may be arranged in an in-line configuration, if desired.

Air induction system 14 may include components configured to introduce air into power source 12. For example, air induction system 14 may include at least one compressor, and an air cooler 28, and such components may be fluidly connected to an intake manifold 82 of the power source 12. As shown in FIG. 1, in exemplary embodiments, the intake manifold 82 may be a common intake manifold fluidly connected to each of the combustion chambers 22. Alternatively, in additional exemplary embodiments, more than one intake manifold 82 may be employed.

Each compressor may embody a fixed geometry compressor, a variable geometry compressor, or any other type of compressor configured to receive air and compress the air to a predetermined pressure level before it enters power source 12. In one embodiment, air induction system 14 includes four substantially identical compressors (a first compressor 24, a second compressor 25, a third compressor 26, and a fourth compressor 27) disposed in a parallel relationship and connected to power source 12 via a fluid passageway 32. In an exemplary embodiment, the fluid passageway 32 may extend from each of the compressors 24, 25, 26, 27 to the intake manifold 82. In further exemplary embodiments, at least one of the compressors 24, 25, 26, 27 may be fluidly connected to the fluid passageway 32 via one or more separate passages 72. One or more of the compressors 24, 25, 26, 27 may also be fluidly connected to an inlet passageway 30 through which inlet air may be drawn into the air induction system 14.

Air cooler 28 may embody an air-to-air heat exchanger, an air-to-liquid heat exchanger, or a combination of both, and may be configured to facilitate the transfer of thermal energy to or from the compressed air directed into power source 12. Air cooler 28 may be disposed within fluid passageway 32, between power source 12 and compressors 24, 25, 26, 27. In an exemplary embodiment, the air cooler 28 may comprise any type of separate circuit aftercooler known in the art.

Exhaust system 16 may include components configured to direct exhaust from power source 12 to the atmosphere. Specifically, exhaust system 16 may include first and second exhaust manifolds 34, 36 in parallel fluid communication with combustion chambers 22, a recirculation circuit 38 fluidly communicating first exhaust manifold 34 with air induction system 14, and at least one turbine associated with first and second exhaust manifolds 34, 36. It is contemplated that exhaust system 16 may include components in addition to those listed above such as, for example, particulate traps, oxidation catalysts, selective catalytic reduction catalysts, constituent absorbers or reducers, and/or other known exhaust treatment devices, if desired.

Exhaust produced during the combustion process within combustion chambers 22 may exit power source 12 via either first exhaust manifold 34 or second exhaust manifold 36. In the embodiment shown, first exhaust manifold 34 may be fluidly connected to a first plurality of combustion chambers 22 of power source 12 (e.g., the eight combustion chambers 22 shown in the lower bank of FIG. 1), and the second exhaust manifold 36 may be fluidly connected to a second plurality of combustion chambers 22 of power source 12 (e.g., the eight combustion chambers shown in the upper bank of FIG. 1) in parallel with the first exhaust manifold 34. In an exemplary embodiment, at least two turbines may be fluidly connected to the first and second exhaust manifolds 34, 36. For example, as shown in FIG. 1, the exhaust system 16 may include a passage 80 fluidly connecting the first and second manifolds 34, 36, and each of a plurality of turbines may be fluidly connected to the passage 80. Although FIG. 1 illustrates four substantially identical turbines (a first turbine 40, a second turbine 41, a third turbine 42, and a fourth turbine 43) disposed in a parallel relationship and connected to the passage 80 via respective passages 74, in further exemplary embodiments, the exhaust system 16 may include greater or less than four turbines 40, 41, 42, 43. For example, further embodiments of the exhaust system 16 may include at least two turbines configured to receive exhaust from the first and second exhaust manifolds 34, 36. One or more of the turbines 40, 41, 42, 43 may also be fluidly connected to an outlet passageway 44 through which exhaust may be released to the atmosphere or to other exhaust treatment devices of the exhaust system 16.

Recirculation circuit 38 may be any type of known EGR circuit, and may include components that cooperate to redirect a portion of the exhaust produced by power source 12 from the first and/or second exhaust manifolds 34, 36 to air induction system 14. Specifically, recirculation circuit 38 may include an inlet port 52, a cooler 54, one or more recirculation valves 56, 87, one or more sensors 46, and a mixer 48. Inlet port 52 may be fluidly connected to first exhaust manifold 34 upstream of turbines 40, 41, 42, 43, and fluidly connected to cooler 54 via a fluid passageway 60. Cooler 54 may be configured to reduce a temperature of exhaust flowing through recirculation circuit 38. Cooler 54 may include a liquid-to-air heat exchanger, an air-to-air heat exchanger, or any other type of heat exchanger known in the art for cooling an exhaust flow. In an exemplary embodiment, the cooler 54 may comprise any type of EGR cooler commonly employed by similar EGR or recirculation circuits. The cooler 54 may be, for example, a separate circuit aftercooler, and the cooler 54 may have a configuration similar to the air cooler 28 discussed above.

The recirculation valve 56 may receive exhaust from cooler 54 via a fluid passageway 62, and may discharge exhaust to the mixer 48. Recirculation valve 56 may be disposed within fluid passageway 62, between cooler 54 and an entrance of the inlet manifold 82. It is further contemplated that a check valve (not shown), for example a reed-type check valve may be situated within fluid passageway 62 upstream or downstream of recirculation valve 56 at a location where exhaust mixes with inlet air to provide for a unidirectional flow of exhaust through recirculation circuit 38 (i.e., to inhibit bidirectional exhaust flows through recirculation circuit 38), if desired. In an exemplary embodiment, such a check valve may be disposed at an entrance of the mixer 48 or may be formed integrally with the mixer 48.

Recirculation valve 56 may be located and/or otherwise configured to regulate a recirculated flow of exhaust through recirculation circuit 38. For example, the recirculation valve 56 may be fluidly connected to the first exhaust manifold 34 and/or the second exhaust manifold 36, and the recirculation valve 56 may be configured to divert and/or otherwise direct a portion of the exhaust exiting the power source 12 to the recirculation circuit 38. Recirculation valve 56 may be any type of valve known in the art such as, for example, a butterfly valve, a diaphragm valve, a gate valve, a ball valve, a poppet valve, or a globe valve. In addition, recirculation valve 56 may be solenoid-actuated, hydraulically-actuated, pneumatically-actuated or actuated in any other manner to selectively (i.e., variably) restrict or completely block the flow of exhaust through fluid passageways 60 and 62. The recirculation valve 56 may be in communication with a controller 76 associated with the power system 10, and the recirculation valve 56 may be controlled in response to signals received from the controller 76.

The recirculation valve 87 may be substantially similar to recirculation valve 56. For example, the recirculation valve 87 may also be any type of butterfly valve, diaphragm valve, gate valve, ball valve, poppet valve, or globe valve, and the recirculation valve 87 may be controlled by the controller 76 in any manner to selectively (i.e., variably) restrict or completely block a flow of exhaust. The recirculation valve 87 may be fluidly connected to the first exhaust manifold 34 and/or the second exhaust manifold 36, and the recirculation valve 87 may be configured to assist in diverting and/or otherwise directing a portion of the exhaust exiting the power source 12 to the recirculation circuit 38. For example, the recirculation valve 87 may be configured to restrict passage of exhaust through at least one of the first and second exhaust manifolds 34, 36, and to simultaneously direct exhaust to the recirculation circuit 38. In an exemplary embodiment, the recirculation valve 87 may be disposed within the passage 80, and may be configured to selectively restrict or completely block the flow of exhaust through the passage 80. At least partially restricting the flow of exhaust through the passage 80 may create a backpressure upstream of the recirculation valve 87. For example, in the embodiment illustrated in FIG. 1, at least partially restricting flow from the first exhaust manifold 34 into the passage 80 with the recirculation valve 87 may create a backpressure in the first exhaust manifold 34. This backpressure, and thus the recirculation valve 87, may assist in directing a portion of the exhaust exiting the power source 12 via the first exhaust manifold 34 to enter the recirculation circuit 38.

The recirculation valve 87 may be characterized by a greater flow capacity than the recirculation valve 56. In one example, the greater flow capacity of recirculation valve 87 may be due to an increased cross-sectional flow area or area/radius (A/R) ratio at a housing opening of the recirculation valve 87 as compared to a cross-sectional flow area or A/R ratio of the recirculation valve 56. It is contemplated that other ways of providing the greater flow capacity of recirculation valve 87 may also be possible. Additionally, the recirculation valve 87 may be configured to accept fluids such as uncooled combustion exhaust having temperatures of, for example, 200 degrees Celsius or greater. The recirculation valve 87 and its various components may be, for example, made from ceramics, metals, composites, alloys, and/or other like materials configured to withstand extended exposure to fluids having such elevated temperatures.

It is understood that the recirculation valve 87 may be configured to regulate the pressure of exhaust flowing through first exhaust manifold 34 by selectively allowing exhaust to flow from first exhaust manifold 34 to second exhaust manifold 36 (i.e., by selectively adjusting a restriction placed on the flow through the passage 80). In exemplary embodiments, the pressure within first exhaust manifold 34 may affect the amount of exhaust directed through recirculation circuit 38. That is, when a greater amount of exhaust flows from first exhaust manifold 34 to second exhaust manifold 36 by way of the passage 80, a pressure within first exhaust manifold 34 may be reduced and, as a result of the pressure reduction, an amount of exhaust passing from first exhaust manifold 34 through recirculation circuit 38 may be reduced proportionally.

The sensor 46 may be any type of flow, temperature, pressure, and/or fluid composition sensor known in the art. For example, the sensor 46 may comprise one or more thermocouples, thermopiles, thermometers, and/or other known devices configured to determine a temperature of fluid passing proximate thereto. The sensor 46 may also comprise one or more venturi-type flow sensors or other like devices configured to determine a flow rate, velocity, pressure, or other characteristic of fluid passing therethrough. The sensor 46 may further comprise one or more NOx sensors or other like devices configured to determine a chemical composition or make-up of fluid passing proximate thereto. Such sensors may, for example, be configured to determine a NOx concentration, an oxygen concentration, and/or a sulfur concentration of the exhaust passing through the recirculation circuit 38. In additional exemplary embodiments, such sensors may be positioned and/or configured to determine, for example, the sulfur content and/or other known characteristics of the fuel directed to the power source 12 and/or injected into one or more of the combustion chambers 22. For example, as shown in FIG. 1, in an exemplary embodiment, one or more sensors 78 may be disposed within and/or proximate one or more of the combustion chambers 22 of the power source 12. Such sensors 78 may be configured to determine any of the fuel or exhaust characteristics described herein. Such sensors 78 may, alternatively be disposed in fluid communication with one or more fuel lines (not shown), fuel rails (not shown), and/or fuel supplies (not shown) associated with the power source 12 for determining such fuel characteristics.

In exemplary embodiments, the sensor 46 may be configured to determine one or more of the above characteristics of the exhaust passing through the recirculation circuit, and the sensor 46 may be configured to direct one or more signals to the controller 76 indicative of such characteristics. Likewise, one or more of the sensors 78 may be configured to determine one or more of the above characteristics of the fuel and/or of the exhaust within and/or exiting the combustion chamber 22. It is understood that any of the valves or other power system components discussed herein may be controlled in response to such signals and/or based on such characteristics.

It is further contemplated that one or more of the sensors 46, 78 may alternatively embody a virtual sensor. A virtual sensor may produce a model-driven estimate based on one or more known or sensed operational parameters of power system 10, exhaust system 16, and/or air induction system 14. For example, based on a known operating speed, load, temperature, boost pressure, ambient conditions (humidity, pressure, temperature), and/or other parameter of power system 10, a model may be referenced to determine the concentration of NOx in the exhaust. Similarly, based on a known or estimated NOx production of power system 10, a flow rate of exhaust exiting power system 10, and/or a temperature of the exhaust, the model may be referenced to determine one or more additional characteristics of the exhaust. As a result, the signal directed from the sensor 46, 78 to the controller 76 may be based on calculated and/or estimated values rather than direct measurements, if desired. It is contemplated that rather than a separate element, these virtual sensing functions may be accomplished by controller 76, if desired.

The controller 76 may embody a single or multiple microprocessors, field programmable gate arrays (FPGAs), digital signal processors (DSPs), etc. that include a means for controlling an operation of power system 10 in response to signals received from the various sensors 46, 78 described herein. As shown schematically in FIG. 1 for ease of description, the controller 76 may be controllably connected to and/or otherwise in communication with, for example, the sensors 46, 78, recirculation valves 56, 87, and turbocharger valves 58, 50 (described in further detail below), as well as other power system components. Numerous commercially available microprocessors can be configured to perform the functions of the controller 76. It should be appreciated that the controller 76 could readily embody a microprocessor separate from that controlling other non-exhaust related power system functions, or that the controller 76 could be integral with a general power system microprocessor and be capable of controlling numerous power system functions and modes of operation. If separate from the general power system microprocessor, the controller 76 may communicate with the general power system microprocessor via datalinks or other methods. Various other known circuits may be associated with the controller 76, including power supply circuitry, signal-conditioning circuitry, actuator driver circuitry (i.e., circuitry powering solenoids, motors, or piezo actuators), communication circuitry, and other appropriate circuitry.

Mixer 48 may be any type of fluid mixing device known in the art. For example, the mixer 48 may comprise a junction having multiple fluid inputs and one or more fluid outputs. The mixer 48 may include one or more internal chambers or flow passages facilitating the substantially homogeneous mixing of fluids within the mixer 48. In addition, the mixer 48 may include one or more fins, vanes, or other like structures configured to assist in mixing and/or combining two or more fluid flows. Such structures may, for example, create a substantially turbulent flow within the mixer 48 to facilitate substantially homogeneous mixing of the two or more fluid flows. In further exemplary embodiments, the mixer 48 may include one or more moveable mixing structures or devices configured to assist in mixing the two or more fluid flows, and such moveable devices may be controlled in response to one or more control signals received from the controller 76. Such control signals may be based on, for example, one or more sensed or otherwise determined characteristics of the fluid flows entering the mixer 48. Such characteristics may include, for example, temperature, pressure, flow rate, composition, and/or any of the other fluid characteristics described herein. As shown in FIG. 1, in an exemplary embodiment the mixer 48 may be disposed within the recirculation circuit 38 downstream of the recirculation valve 56 and upstream of the intake manifold 82. The mixer 48 may be configured to direct a combined flow of fluid to the power source 12, and such a combined flow may include, for example, exhaust from the recirculation circuit 38 and air directed to the mixer 48 via one or more components of the air induction system 14.

With continued reference to the exhaust system 16 shown in FIG. 1, the first turbine 40 may be a fixed geometry turbine having a single volute and being configured to receive exhaust from the first and/or second exhaust manifolds 34, 36 to drive one or more of compressors 24, 25, 26, 27. For example, first turbine 40 may be directly and mechanically connected to first compressor 24 by way of a shaft 64 to form a first turbocharger 66. As the hot exhaust gases exiting power source 12 move through first turbine 40 and expand against blades (not shown) therein, first turbine 40 may rotate and drive the connected first compressor 24 to pressurize air directed into power source 12. It is contemplated that first turbine 40 may alternatively be a variable geometry turbine having an adjustable nozzle ring or adjustable vane members, if desired.

Second turbine 41 may also be connected to one of compressors 24, 25, 26, 27 to form a fixed or variable geometry turbocharger 92. For example, second turbine 41 may be directly and mechanically connected to second compressor 25 by way of a shaft 65 to form second turbocharger 92. In the depicted arrangement, second turbine 41 may be a single volute turbine situated to receive exhaust from the first and/or second exhaust manifolds 34, 36. As the hot exhaust gases exiting power source 12 move through second turbine 41 and expand against blades (not shown) therein, second turbine 41 may rotate and drive the connected second compressor 25 to pressurize air directed into power source 12.

Third turbine 42 may similarly be connected to one of compressors 24, 25, 26, 27 to form a third fixed or variable geometry turbocharger 94. For example, third turbine 42 may be directly and mechanically connected to third compressor 26 by way of a shaft 68 to form third turbocharger 94. In the depicted arrangement, third turbine 42 may be a single volute turbine situated to receive exhaust from the first and/or second exhaust manifolds 34, 36. As the hot exhaust gases exiting power source 12 move through third turbine 42 and expand against blades (not shown) therein, third turbine 42 may rotate and drive third compressor 26 to pressurize air directed into power source 12.

Fourth turbine 43 may similarly be connected to one of compressors 24, 25, 26, 27 to form a fourth fixed or variable geometry turbocharger 96. For example, fourth turbine 43 may be directly and mechanically connected to fourth compressor 27 by way of a shaft 70 to form fourth turbocharger 96. In the depicted arrangement, fourth turbine 43 may be a single volute turbine situated to receive exhaust from the first and/or second exhaust manifolds 34, 36. As the hot exhaust gases exiting power source 12 move through fourth turbine 43 and expand against blades (not shown) therein, fourth turbine 43 may rotate and drive fourth compressor 27 to pressurize air directed into power source 12. As shown in FIG. 1, in an exemplary embodiment, the turbines 40, 41, 42, 43 and/or associated turbochargers 66, 92, 94, 96 may be fluidly connected to the passage 80 via separate passages 74. The turbines 40, 41, 42, 43 and/or associated turbochargers 66, 92, 94, 96 may be situated to receive exhaust, in parallel, from the first and/or second exhaust manifolds 34, 36. For example, each respective turbocharger 66, 92, 94, 96 may be driven by exhaust received from the first and/or second exhaust manifolds 34, 36, and each turbocharger 66, 92, 94, 96 may be configured to remove energy from a respective flow of exhaust received from the power source 12. Such energy may include thermal energy, kinetic energy, and/or any other type of energy commonly associated with flows of fluid combustion exhaust.

As shown in FIG. 1, flow through one or more of the turbochargers 66, 92, 94, 96 may be regulated by one or more respective flow control valves. For example, respective first and second turbocharger valves 50, 58 may be fluidly connected to one or more of the turbochargers 66, 92, 94, 96. As shown with respect to turbocharger 96, the turbocharger valve 50 may be configured to selectively fluidly connect and/or disconnect turbocharger 96 to the first and second exhaust manifolds 34, 36, and the turbocharger valve 58 may be configured to selectively fluidly connect and/or disconnect turbocharger 96 to the intake manifold 82 via fluid passageway 32. The turbocharger valves 50, 58 described herein may be any type of valve such as, for example, a butterfly valve, a diaphragm valve, a gate valve, a ball valve, a globe valve, a poppet valve, or any other valve known in the art. Furthermore, turbocharger valves 50, 58 may be solenoid-actuated, hydraulically-actuated, pneumatically-actuated or actuated in any other manner. The turbocharger valve 50 may be configured to selectively restrict or completely block exhaust from entering or exiting the turbocharger 96, and the turbocharger valve 58 may be configured to selectively restrict or completely block air from entering or exiting the turbocharger 96. Although FIG. 1 illustrates turbocharger valve 50 being disposed upstream of the turbine 43 in passage 74, in further exemplary embodiments, the turbocharger valve 50 may be disposed between the turbine 43 and the outlet passageway 44. In addition, although FIG. 1 illustrates turbocharger valve 58 being disposed downstream of the compressor 27 in passage 72, in further exemplary embodiments, the turbocharger valve 58 may be disposed between the compressor 27 and the inlet passageway 30.

The turbocharger valves 50, 58 may be controlled based on, or in response to, one or more characteristics of exhaust formed in the combustion chambers 22, exiting the power source 12, passing through the first and/or second exhaust manifolds 34, 36, passing through the recirculation circuit 38, and/or otherwise disposed at any other location within power system 10. Such characteristics may be sensed and/or otherwise determined by one or more of the sensors 46, 78 described herein. For example, the turbocharger valve 50 may be configured to block exhaust from entering the turbocharger 96 in response to a determination that greater than or equal to approximately 20 percent of the exhaust exiting the power source 12 is being directed to the recirculation circuit 38. In particular, due to the reduced level of exhaust in such situations, the additional boost and/or exhaust handling capacity provided by turbocharger 96 may not be required by the power source 12. In additional exemplary embodiments, the turbocharger valve 50 may be configured to block exhaust from entering the turbocharger 96 in response to a determination that a NOx concentration of exhaust exiting the power source 12 is less than or equal to approximately 2.0 gNOx/KwHr. Such NOx levels may be indicative of, for example, an operating condition in which greater than or equal to approximately 20 percent of the exhaust exiting the power source 12 is being directed to the recirculation circuit 38. Such NOx levels may, for example, satisfy the IMO3 emissions regulations noted above.

INDUSTRIAL APPLICABILITY

The disclosed air induction and exhaust systems 14, 16 may be employed in any power system application where charged air induction and exhaust gas recirculation are utilized. The disclosed air induction and exhaust systems 14, 16 may be suitable for both high-boost and low-boost applications. Such applications may include any of a number of construction, mining, power generation, on-highway transportation, off-highway transportation, and/or marine applications. Accordingly, the disclosed air induction and exhaust systems 14, 16 may be configured for use on, in, or with any vehicle or machine commonly used in such applications. Such machines may include, for example, wheel loaders, motor graders, excavators, on-highway vehicles, off-highway vehicles, marine vessels, and/or other known machines associated with such applications.

During an exemplary method of use, the power source 12 may generate combustion exhaust, and the exhaust may be directed to one or more of the turbochargers 66, 92, 94, 96 via the first and/or second exhaust manifolds 34, 36. The exhaust may be directed to the passage 80, and the exhaust may be divided into two or more separate exhaust flows at or upstream of the turbochargers 66, 92, 94, 96. For example, first, second, third, and fourth flows of exhaust may be formed from the exhaust received from power source 12, and such flows may be formed at the intersection of the passage 80 with each respective passage 74. In addition, a recirculation flow of exhaust may be formed from the exhaust received from power source 12, and such a recirculation flow may be formed at, for example, the inlet port 52 of the fluid passageway 62.

As the individual flows of exhaust enter the respective turbochargers 66, 92, 94, 96, each turbocharger 66, 92, 94, 96 may remove energy from a respective flow in parallel. For example, while energy may be removed from the first flow of exhaust with one of the turbochargers 66, 92, 94, 96, energy may be removed from the second flow of exhaust, in parallel with the removal of energy from the first flow of exhaust, by another of the turbochargers 66, 92, 94, 96. In addition, one or both of the recirculation valves 56, 87 may be controlled to direct the recirculation flow to the recirculation circuit 38.

For example, during a first mode of operation, the recirculation valve 87 may be disposed in an open position such that exhaust may be allowed to flow through the passage 80 substantially unrestricted by the recirculation valve 87, and the recirculation valve 56 may be disposed in a partially open position such that the recirculation flow may be directed to enter the recirculation circuit 38. It is understood that such positions of the recirculation valves 56, 87 may result in a lower pressure within the fluid passageway 60 than in, for example, the first exhaust manifold 34. Thus, when configured in such positions, the recirculation valves 56, 87 may direct the recirculation flow of exhaust to enter the recirculation circuit 38. This recirculation flow may pass through the cooler 54, mix with cooled intake air at the mixer 48, and be directed back into the power source 12 via the intake manifold 82. It is understood that the intake air may be directed to the mixer 48 via one or more of the compressors 24, 25, 26, 27, and via the air cooler 28. During a second mode of operation in which an increased recirculation flow of exhaust is required, both recirculation valves 56, 87 may be transitioned to their respective fully open positions. When configured in such positions, the recirculation valves 56, 87 may increase the percentage of recirculated exhaust being combusted by the power source 12, and the resulting combustion exhaust generated by the power source 12 may have correspondingly reduced levels of NOx and other harmful pollutants. Moreover, during a third mode of operation the recirculation valve 56 may be transitioned to its fully open position and the recirculation valve 87 may be at least partially closed. By partially closing the recirculation valve 87 while the recirculation valve 56 is fully opened, the recirculation valve 87 may create backpressure between the recirculation valve 87 and the inlet port 52. Such backpressure may assist in further augmenting and/or maximizing the recirculation flow of exhaust. The controller 76 and/or an operator may control operation of the recirculation valves 56, 87 in this way in order to meet various applicable emissions regulations during operation of the power system 10, and such control may be varied vary if, for example, during a single operation the power system 10 is used in multiple regions, each having different respective emissions regulations.

During operation of the power system 10, one or more of the sensors 46, 78 may determine one or more characteristics of exhaust generated by the power source 12 and/or of fuel provided to the power source 12. For example, one or more of the sensors 46, 78 may sense and/or otherwise determine a volume, flow rate, NOx concentration, temperature, pressure, and/or other characteristic of the exhaust. Such exhaust characteristics may be determined anywhere within the power system 10. For example, such characteristics may be associated with the recirculation flow of exhaust, and may be determined anywhere between the inlet port 52 and the mixer 48. Alternatively, such characteristics may be associated with exhaust within the combustion chambers 22, exhaust exiting the power source 12 via one or both of the first and second exhaust manifolds 34, 36, or exhaust passing to one or more of the turbochargers 66, 92, 94, 96 via the passage 80 and/or via the respective passages 74. It is understood that one or more of the sensors 46, 78 may be disposed at any of the above locations for determining such characteristics, and such sensors 46, 78 may be configured to send one or more signals to the controller 76 indicative of such characteristics. The controller 76 may then control operation of one or more of valves 50, 56, 58, 87 based on or in response to such characteristics or signals.

For example, one or more of the sensors 46, 78, such as the sensor 46, may determine a characteristic of the recirculation flow of exhaust and the controller 76 may transition the turbocharger valve 50 from an open position to a closed position, thereby blocking passage of exhaust into the turbocharger 96, based on the determined characteristic. The controller 76 may also transition the turbocharger valve 58 from an open position to a closed position, thereby blocking passage of inlet air into the turbocharger 96, based on the determined characteristic. In still further embodiments, the turbocharger valves 50, 58 may be transitioned between the open and closed positions by an operator manually, such as via manipulation of one or more levers, switches, knobs, and/or other like operator interfaces known in the art. An operator may manually operate the turbocharger valves 50, 58 upon, for example, entering a region having relatively stringent emissions regulations, such as the IMO3 emissions regulations described above. For example, an operator may manually close turbocharger valves 50, 58 in conjunction with fully opening recirculation valve 56 and at least partially closing recirculation valve 87. With both turbocharger valves 50, 58 in the closed position, the turbocharger 96 may be fluidly disconnected from the first and second intake manifolds 34, 36, as well as from the fluid passageway 32 of the air induction system 16. Additionally, as described above, fully opening recirculation valve 56 and at least partially closing recirculation valve 87 may increase and/or maximize the recirculation exhaust flow to satisfy applicable emissions regulations.

Such operation of the turbocharger valves 50, 58 may be useful in any situation where the volume and/or amount of exhaust directed back into the power source 12 by the recirculation circuit 38 is at an elevated level. Since the total amount of exhaust received by the turbochargers 66, 92, 94 is reduced in such situations, the turbochargers 66, 92, 94 have adequate capacity to handle the exhaust without operation of turbocharger 96. In fact, due to the reduced level of exhaust received by the turbochargers 66, 92, 94 in such situations one or more of the turbochargers 66, 92, 94, 96 may operate outside of its peak efficiency range if the turbocharger 96 was not fluidly disconnected from the first and second exhaust manifolds 34, 36. Thus, by fluidly disconnecting the turbocharger 96 from the first and second exhaust manifolds 34, 36, each of the remaining turbochargers 66, 92, 94 may maintain operation within their respective peak efficiency ranges, thereby maximizing the overall fuel efficiency and power generation of the power system 10 during operation of the power source 12 with recirculated exhaust.

It is common to operate the power source 12 using recirculated exhaust in situations where it is necessary to reduce the concentration of NOx or other harmful pollutants emitted by the power source 12. For example, in order to meet the stringent IMO3 emissions regulations noted above, at least 20 percent of the exhaust exiting the power source 12 may be directed to the recirculation circuit 38 and back into the power source 12. In further embodiments, depending on the size of the power source 12 and/or other characteristics of the power system 10, between approximately 20 percent and approximately 30 percent of the exhaust exiting the power source 12 may be directed to the recirculation circuit 38 and back into the power source 12 to assist in reducing emissions. Such levels of recirculated exhaust may assist in reducing the NOx concentration of the exhaust exiting the power source 12 to less than or equal to approximately 2.0 gNOx/KwHr. Thus, in exemplary embodiments, a flow of exhaust into the turbocharger 96 may be blocked by the turbocharger valve 50, either manually (i.e., by operator manipulation of an operator interface) or automatically (i.e., by the controller 76), in response to directing approximately 20 percent or more of the exhaust exiting the power source 12 back into the power source 12. In further exemplary embodiments, a flow of exhaust into the turbocharger 96 may be blocked by the turbocharger valve 50, either manually or automatically, in response to a determination that a NOx concentration of exhaust exiting the power source 12 is less than or equal to approximately 2.0 gNOx/KwHr.

In still further exemplary embodiments, it may be possible to reduce the concentration of NOx or other harmful pollutants emitted by the power source 12 through the use of high-sulfur fuels, or other like fuels or additives, in the combustion process. For example, in embodiments in which such fuels are provided to the power source 12 for combustion, it may not be necessary to direct a flow of recirculation exhaust back to the power source 12 to assist in reducing emissions. Instead, stringent emissions regulations, such as the IMO3 regulations described above, may be satisfied by using, for example, fuel having a sulfur content greater than or equal to approximately 20 percent. Thus, in such exemplary embodiments, passage of the recirculation flow of exhaust described above through the recirculation circuit 38 may be blocked in response to a sulfur content of the fuel directed to the power source being greater than the sulfur content threshold of approximately 20 percent. The recirculation flow of exhaust may be blocked from passing through the recirculation circuit 38 by, for example, transitioning the recirculation valve 56 to the closed position.

It is understood that the recirculation valves 56, 87 may be opened, closed, and/or otherwise variably controlled based on a requirement for recirculated exhaust and/or a requirement for a reduction in the NOx concentration of exhaust emitted by the power source 12. Turbocharger valves 50, 58 may, thus, be controlled based on and/or in response to the control, position, and/or operation of at least one of the recirculation valves 56, 87. It is further understood that the recirculation valves 56, 87 and/or the turbocharger valves 50, 58 may be controlled and/or operated without regard to and/or independent of engine speed, boost requirements, load, torque, and/or other operating parameters of the power source 12. For example, recirculation valve 56 may be transitioned to the closed position, thereby blocking exhaust from passing through the recirculation circuit 38, independent of engine speed.

The disclosed exhaust system 16 provides a number of advantages over known systems utilizing EGR. For example, the turbocharger valves 50, 58 enable the selective fluid connection and disconnection of turbocharger 96 to first and second exhaust manifolds 34, 36 based on the amount of exhaust directed back to the power source 12. As a result, the fuel efficiency and power generation of the power system 10 may be maximized while EGR is utilized to meet various emissions regulations. In addition, the disclosed exhaust system 16 allows the turbocharger 96 to be fluidly connected and/or disconnected to the exhaust manifolds 34, 36 in situations in which the machine with which the exhaust system 16 is used passes into and out of regions having different emissions regulations. Accordingly, the disclosed exhaust system 16 may maximize the fuel efficiency and power generation of the power system 10 in various locations having differing emissions regulations.

It will be apparent to those skilled in the art that various modifications and variations can be made to the disclosed exhaust system 16. Other embodiments will be apparent to those skilled in the art from consideration of the specification and practice of the disclosed exhaust system 16. It is intended that the specification and examples be considered as exemplary only, with a true scope being indicated by the following claims and their equivalents.

What is claimed is:

1. An exhaust system for an engine, comprising:
    a first exhaust manifold configured to receive exhaust from the engine;
    a second exhaust manifold configured to receive exhaust from the engine in parallel with the first exhaust manifold;
    at least two turbochargers configured to receive exhaust from the first and second exhaust manifolds;
    a first turbocharger valve fluidly connected to one of the at least two turbochargers, the first turbocharger valve being configured to selectively fluidly connect the one of the at least two turbochargers to the first and second exhaust manifolds;
    a recirculation circuit in fluid communication with the first exhaust manifold, the recirculation circuit including a first recirculation valve configured to regulate passage of exhaust through the recirculation circuit;
    a common intake manifold, wherein the recirculation circuit fluidly connects the first exhaust manifold to the common intake manifold via the first recirculation valve;
    a second turbocharger valve fluidly connected to the one of the at least two turbochargers, the second turbocharger valve being configured to selectively fluidly connect the one of the at least two turbochargers to the common intake manifold;
    and wherein the first turbocharger valve is configured to block exhaust from entering the one of the at least two turbochargers in response to greater than or equal to approximately 20 percent of exhaust exiting the engine being directed to the recirculation circuit.

2. The exhaust system of claim 1, further including a second recirculation valve configured to restrict passage of exhaust through at least one of the first and second exhaust manifolds, and to simultaneously direct exhaust to the recirculation circuit.

3. The exhaust system of claim 2, wherein a flow capacity of the second recirculation valve is greater than a flow capacity of the first recirculation valve.

4. The exhaust system of claim 2, further including a passage connecting the first and second exhaust manifolds, wherein the second recirculation valve is disposed within the passage.

5. The exhaust system of claim 4, wherein each of the at least two turbochargers is fluidly connected to the passage.

6. The exhaust system of claim 1, further including a cooler disposed within the recirculation circuit upstream of the first recirculation valve.

7. The exhaust system of claim 1, further including a mixer disposed within the recirculation circuit downstream of the first recirculation valve, the mixer being configured to direct a combined flow to the engine, the combined flow comprising exhaust from the recirculation circuit and air directed to the mixer via at least one of the at least two turbochargers.

8. An exhaust system for an engine, comprising:
    a first exhaust manifold configured to receive exhaust from the engine;
    a second exhaust manifold configured to receive exhaust from the engine in parallel with the first exhaust manifold;
    a plurality of turbochargers being driven by exhaust from the first and second exhaust manifolds;
    first and second turbocharger valves associated with a turbocharger of the plurality of turbochargers, the first turbocharger valve selectively fluidly connecting the turbocharger to the first and second exhaust manifolds, the second turbocharger valve selectively fluidly connecting the turbocharger to an intake manifold of the engine;
    a recirculation circuit in fluid communication with the first exhaust manifold; and
    first and second recirculation valves regulating passage of exhaust through the recirculation circuit, wherein the first and second turbocharger valves are controlled based on a characteristic of exhaust passing through the recirculation circuit, and wherein the first turbocharger valve is configured to block exhaust from entering the turbocharger in response to greater than or equal to approximately 20 percent of exhaust exiting the engine being directed to the recirculation circuit.

9. The exhaust system of claim 8, wherein the characteristic further includes a NOx concentration of the exhaust passing through the recirculation circuit.

10. The exhaust system of claim 8, wherein the first turbocharger valve is configured to block exhaust from entering the turbocharger in response to a NOx concentration of exhaust exiting the engine being less than or equal to approximately 2.0 gNOx/KwHr.

11. The exhaust system of claim 8, wherein the first recirculation valve is configured to block passage of exhaust through the recirculation circuit in response to a sulfur content of fuel directed to the engine being greater than a sulfur content threshold.

12. The exhaust system of claim 8, further including a cooler disposed within the recirculation circuit upstream of the first recirculation valve.

13. A method of handling exhaust from an engine, comprising:
    receiving exhaust from the engine;
    forming a first flow of exhaust, a second flow of exhaust, and a recirculation flow of exhaust with the exhaust received from the engine;
    removing energy from the first flow of exhaust with a turbocharger;
    removing energy from the second flow of exhaust in parallel with the removal of energy from the first flow of exhaust;
    directing the recirculation flow of exhaust back into the engine;
    determining a characteristic of the recirculation flow of exhaust; and
    blocking passage of the first flow of exhaust into the turbocharger based on the characteristic, wherein the characteristic is forming the recirculation flow of exhaust with greater than or equal to approximately 20 percent of the exhaust received from the engine.

14. The method of claim 13, wherein the characteristic further includes NOx concentration of the recirculation flow of exhaust.

15. The method of claim 13, further including blocking passage of the first flow of exhaust into the turbocharger in response to a NOx concentration of the exhaust received from the engine being less than or equal to approximately 2.0 gNOx/KwHr.

16. The method of claim 13, further including blocking passage of the recirculation flow of exhaust through the recirculation circuit in response to a sulfur content of fuel directed to the engine being greater than a sulfur content threshold.

* * * * *